(12) United States Patent
Stroud

(10) Patent No.: US 7,905,447 B2
(45) Date of Patent: Mar. 15, 2011

(54) SYSTEM, METHOD AND APPARATUS FOR AIRCRAFT HAVING COUNTER-ROTATING, RING-WINGED ROTORS

(75) Inventor: Ronald L. Stroud, Benbrook, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 621 days.

(21) Appl. No.: 11/985,722

(22) Filed: Nov. 16, 2007

(65) Prior Publication Data
US 2009/0127381 A1    May 21, 2009

(51) Int. Cl.
*B64C 27/10*    (2006.01)
(52) U.S. Cl. .................. 244/17.23; 416/126; 416/129
(58) Field of Classification Search ............. 244/17.11, 244/17.23, 17.19, 23 C, 12.2; 416/122, 129, 416/126, 227 A
See application file for complete search history.

(56) References Cited

U.S. PATENT DOCUMENTS

| | | | |
|---|---|---|---|
| 1,419,962 A * | 6/1922 | Denham | 244/17.11 |
| 1,705,489 A * | 3/1929 | Mladinich | 416/129 |
| 1,864,848 A * | 6/1932 | Munk | 416/227 A |
| 2,456,485 A | 12/1948 | Bendix | |
| 2,653,779 A | 9/1953 | Terry | |
| 2,870,847 A | 1/1959 | Fry | |
| 3,002,711 A | 10/1961 | Stefano | |
| 3,482,803 A * | 12/1969 | Lindenbaum | 244/17.11 |
| 3,606,209 A * | 9/1971 | Rosta et al. | 244/12.2 |
| 3,633,849 A * | 1/1972 | Kling | 244/12.2 |
| 3,997,131 A * | 12/1976 | Kling | 244/23 C |
| 5,171,127 A * | 12/1992 | Feldman et al. | 416/227 A |
| 5,791,592 A | 8/1998 | Nolan et al. | |
| 6,402,088 B1 * | 6/2002 | Syrovy et al. | 244/12.2 |

FOREIGN PATENT DOCUMENTS

DE    3331166 A1 *    3/1985

* cited by examiner

*Primary Examiner* — Galen Barefoot
(74) *Attorney, Agent, or Firm* — Bracewell & Giuliani LLP

(57) ABSTRACT

An aircraft having counter-rotating, ring-type wing rotors that are driven by engines located at the wing tips is disclosed. The aircraft incorporates large span, high aspect ratio wings that are configured in a joined-tip design to improve the structural characteristics of the wings. One of the wings counter-rotates inside the other wing to enable vertical take-off and landing. The wings may comprise elliptical shapes, each having upper and lower sections that are separated from each other.

29 Claims, 3 Drawing Sheets

SYSTEM, METHOD AND APPARATUS FOR AIRCRAFT HAVING COUNTER-ROTATING, RING-WINGED ROTORS

BACKGROUND OF THE INVENTION

1. Technical Field

The present invention relates in general to and, in particular, to an improved system, method and apparatus for an aircraft having counter-rotating, ring-wing rotors that are driven by engines located at their wing tips.

2. Description of the Related Art

Some types of aircraft missions require extended flight time endurance (e.g., continuous flight exceeding days, weeks or conceivably years), preferably without refueling, and the capacity to perform at high altitudes. Such missions include operations like reconnaissance, weather surveillance, communications relay, scientific observation and military operations.

Historically, these types of flight missions have been addressed by using lighter-than-air vehicles (e.g., dirigibles) and satellites instead of airborne, heavier-than-air vehicles. However, lighter-than-air vehicles tend to operate at low speeds and have difficulty with high winds. They also require special handling and large hangers for maintenance or storage. Furthermore, satellites are extremely expensive, cannot launch on short notice, and are limited in their ability to relocate to another area of interest.

Recent attempts at heavier-than-air, long endurance, high altitude air vehicles have employed wings that have large span, high aspect ratios. These designs tend to be fragile and difficult to control. Such aircraft also have had numerous difficulties with structural deflections and other types of failures when encountering wind gusts or higher than expected loads. In addition, these designs require long runways and ideal weather conditions for both launch and recovery.

Thus, these types of missions tend to be addressed by using lighter-than-air vehicles. To date there is no heavier-than-air solution that adequately addresses the performance criteria required for these operations. Although prior art aircraft are workable for long endurance missions, an improved solution that overcomes the limitations and problems associated with those designs would be desirable.

SUMMARY OF THE INVENTION

Embodiments of a system, method and apparatus for an aircraft having counter-rotating wings in a ring-type rotor configuration are disclosed. The wings are directly driven by engines located at the wing tips. The aircraft incorporates large span, high aspect ratio blades or wings that are joined at their outermost tips to improve the structural characteristics of the wings. In one embodiment, one smaller wing counter-rotates inside a second larger wing. This design enables vertical take-off and landing capabilities, thus simplifying launch and recovery operations for the aircraft.

Compared to prior art designs, the invention further improves the ability to control the behavior of a long endurance air vehicle, particularly under adverse operating conditions. In operation, this aircraft tends to behave more like a helicopter than an airplane. However, unlike the helicopter blades, the wings of this aircraft are elliptical, having upper and lower sections that are separated from each other. As such, the wings can better tolerate wind and gusts. In addition, the aircraft can operate from a modest size airfield without long runways.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
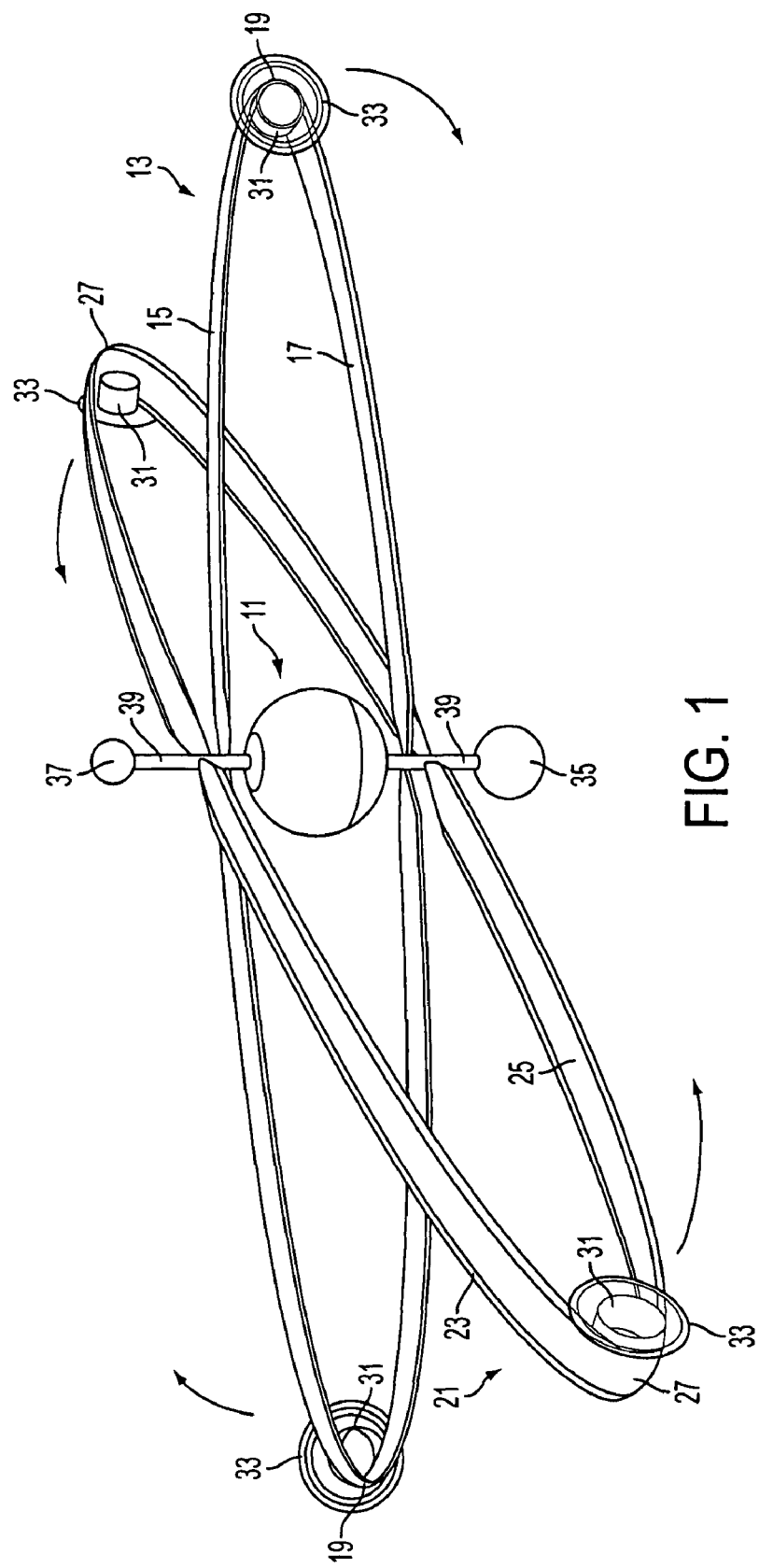
FIG. 1 is an isometric view of one embodiment of an aircraft constructed in accordance with the invention.
Figure 2:
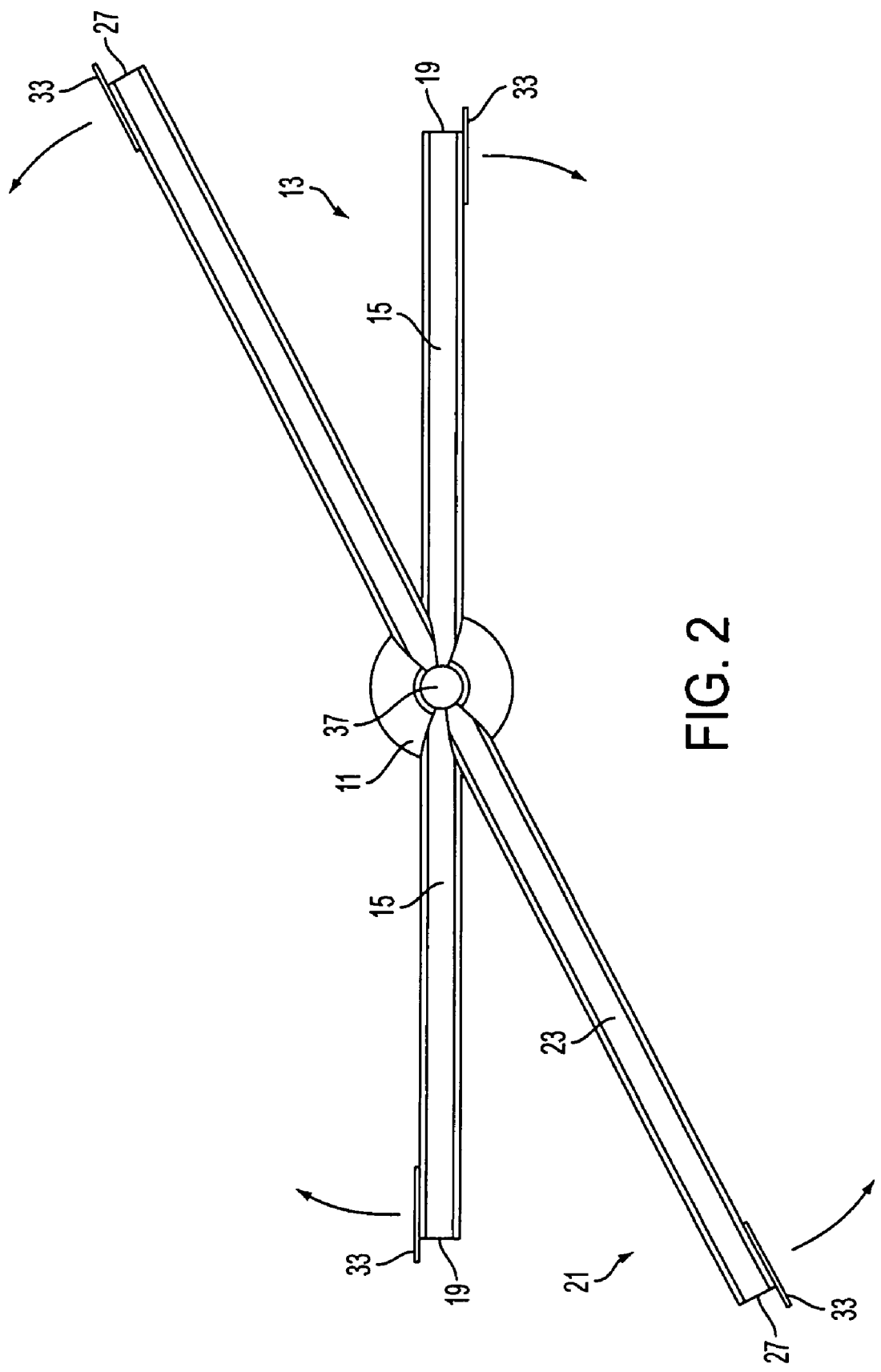
FIG. 2 is a top view of the aircraft of FIG. 1 and is constructed in accordance with the invention.
Figure 3:
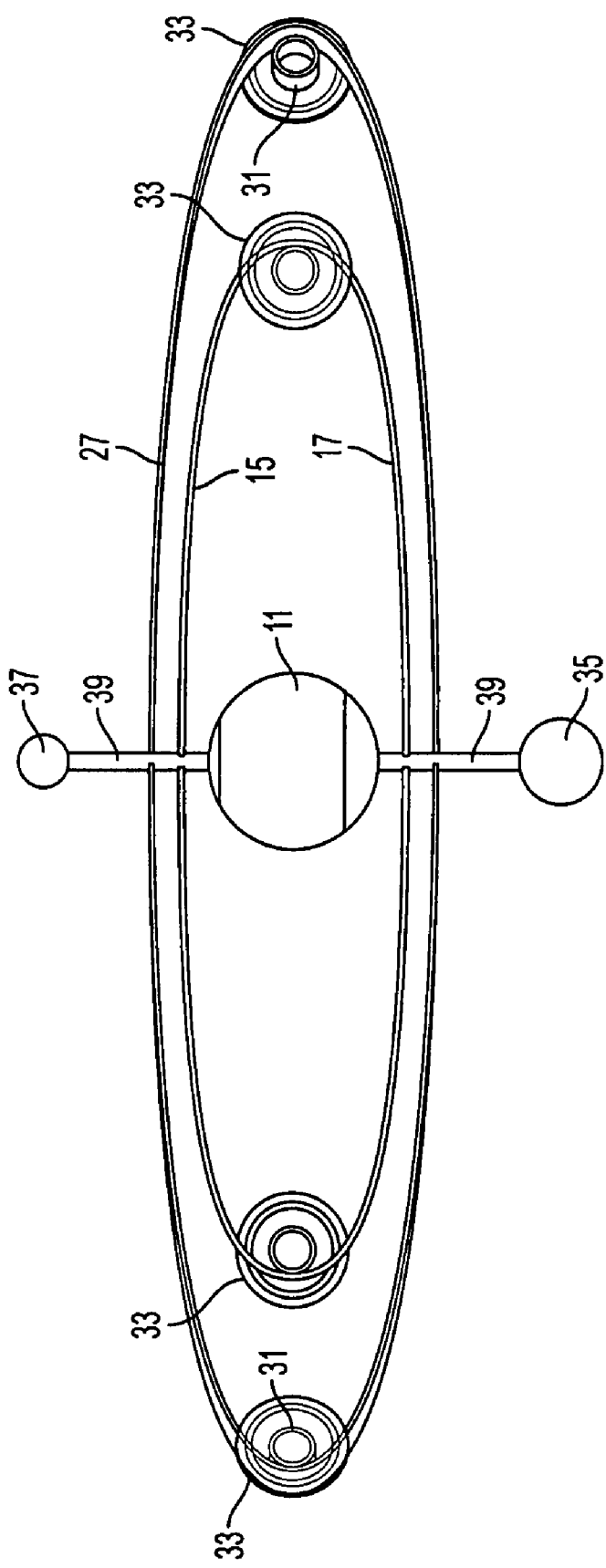
FIG. 3 is a side view of the aircraft of FIG. 1 and is constructed in accordance with the invention.

Referring to FIGS. 1-3, embodiments of a system, method and apparatus for an aircraft having counter-rotating wings in a ring-type rotor configuration are disclosed. In one embodiment, the invention comprises an aircraft having a body 11 and a first rotor 13 rotatably mounted to the body 11 for rotation in a first direction. The first rotor 13 has an upper portion 15 and a lower portion 17 that may form an elliptical loop as shown. In the embodiment shown, the body 11 is located between the upper and lower portions 15, 17, but this configuration is not required for all embodiments.

A second rotor 21 is rotatably mounted to the body 11 for rotation in a second direction that is opposite to the first direction. In the embodiment shown, the second rotor 21 also is elliptical in shape, and the first rotor 13 is smaller than the second rotor 21. The second rotor 21 also has upper and lower portions 23, 25, and the first rotor rotates within the elliptical shape between the upper and lower portions 23, 25 of the second rotor 21. The respective upper and lower portions 15, 17, 23, 25 of the first and second rotors 13, 21 are airfoils that are essentially flat. In one embodiment, flight for the aircraft is provided exclusively by the first and second rotors 13, 21.

The upper and lower portions 15, 17 of the first rotor 13 are joined at respective outer wing tips 19 that located on opposite sides of the body 11. Likewise, the upper and lower portions 23, 25 of the second rotor 21 are joined at respective outer wing tips 27 that located on opposite sides of the body 11. In one embodiment, the first and second rotors 13, 21 form separate continuous rings or loops.

In some embodiments, one or more engines 31 are located at one or more outer wing tips 19, 27 of the first and second rotors 13, 21. In the embodiment shown, each of the four wing tips 19, 27 has an engine 31 mounted thereto. The engines 31 may be used to rotate propellers 33 as shown, or may comprise jet engines. The engines 31 may be located at opposite outer wing tips 19, 17 of the upper and lower portions 15, 17, 23, 25, respectively, of the first and second rotors 13, 21.

In one embodiment, the body 11 is spherical in shape, and a lower ballast 35 is mounted to and located below the body 11. In addition, an upper ballast 37 is mounted to and located above the body 11. The lower ballast 35 may be larger and heavier than the upper ballast 37 in some embodiments. Each of the upper and lower ballasts 35, 37 may be spherical in shape as depicted.

In the embodiment illustrated, the lower ballast 35 is located below the first and second rotors 13, 21, and the upper ballast 37 is located above the first and second rotors 13, 21. Moreover, the body 11, the first and second rotors 13, 21, and the upper and lower ballasts 37, 35 each may be mounted to a single vertical shaft 39 as shown. The features described herein as body and ballast may be used for installation of electronics, fuel tanks and other requisite subsystems and are not limited to spherical shapes. In some embodiments, landing gear may be provided on the aircraft (retractable or non-retractable), or may comprise a discardable dolly.

While the invention has been shown or described in only some of its forms, it should be apparent to those skilled in the art that it is not so limited, but is susceptible to various changes without departing from the scope of the invention.

What is claimed is:

1. An aircraft, comprising:
    a body;
    a first rotor rotatably mounted to the body for rotation in a first direction, the first rotor having an upper portion forming an upper portion airfoil and a lower portion forming a lower portion airfoil, at least substantial portions of the body located between the upper portion airfoil and the lower portion airfoil; and
    a second rotor rotatably mounted to the body for rotation in a second direction that is opposite to the first direction.

2. An aircraft according to claim 1, wherein the upper portion airfoil and the lower portion airfoil of the first rotor together form an elliptical shape when viewed cross-sectionally, with the body being located within confines of the elliptical shape.

3. An aircraft according to claim 1,
    wherein the second rotor as an upper portion forming an upper portion airfoil and a lower portion forming a lower portion airfoil;
    wherein both the first rotor and the second rotor are elliptical in shape when viewed cross-sectionally;
    wherein the first rotor is smaller than the second rotor and is rotatably mounted to rotate within confines of the second rotor;
    wherein a rotation path of the upper portion airfoil of the first rotor is adjacent a rotational path of the upper portion airfoil of the second rotor; and
    wherein a rotation path of the lower portion airfoil of the second rotor is adjacent a rotational path of the lower portion airfoil of the second rotor,
    the rotational paths of the upper portion airfoils of the first and the second rotors adjacent the body substantially separated from the rotational paths of the lower portion airfoils of the first and the second rotors adjacent the body.

4. An aircraft according to claim 1,
    wherein the second rotor also has an upper portion forming an upper portion airfoil and a lower portion forming a lower portion airfoil; and
    wherein the first rotor rotates between the upper and the lower portion airfoils of the second rotor.

5. An aircraft according to claim 1, wherein upper and lower surfaces of the the upper and lower portion airfoils of the first rotor are substantially flat along the respective chord length.

6. An aircraft according to claim 1, wherein the upper and lower portion airfoils of the first rotor are joined at respective outer wing tips located on opposite sides of the body and are substantially separated by substantial portions of the body at respective rotational mounts.

7. An aircraft according to claim 1, wherein an engine is located adjacent outer wing tips of both the upper and lower portion airfoils of the first rotor.

8. An aircraft according to claim 7,
    wherein the engine rotates a propeller; and
    wherein a maximum extent of a propeller pathway of the first rotor is within confines of a pathway of the second rotor.

9. An aircraft according to claim 1, wherein the first rotor has two engines located at opposite outer wing tips of the upper and lower portion airfoils of the first rotor.

10. An aircraft according to claim 1,
    wherein a main portion of the body is spherical in shape;
    wherein the aircraft further comprises a lower ballast mounted to and located below the main portion of the body and an upper ballast mounted to and located above the main portion of the body; and
    wherein the lower ballast is heavier than the upper ballast.

11. An aircraft according to claim 10, wherein each of the upper and lower ballasts is spherical in shape.

12. An aircraft according to claim 10, wherein the lower ballast is located below the first and second rotors, and the upper ballast is located above the first and second rotors.

13. An aircraft according to claim 10, wherein the body, the first and second rotors, and the upper and lower ballasts are each mounted to a single vertical shaft.

14. An aircraft according to claim 1, wherein the upper and lower portions of the first rotor form a continuous loop.

15. An aircraft, comprising:
    a body:
    a first rotor rotatably mounted to the body for rotation in a first direction, the first rotor having an upper portion and a lower portion, the upper and lower portions of the first rotor forming a continuous loop, a main portion of the body located between the upper and lower portions of the first rotor; and
    a second rotor rotatably mounted to the body for rotation in a second direction that is opposite to the first direction, the second rotor also forming a continuous loop, and the first rotor positioned to rotate within the continuous loop of the second rotor.

16. An aircraft according to claim 1, wherein flight for the aircraft is provided exclusively by the first and second rotors.

17. An aircraft, comprising:
    a body;
    a first rotor rotatably mounted to the body for rotation in a first direction, the first rotor having an upper portion forming an upper portion airfoil and a lower portion forming a lower portion airfoil, at least portions of an upper surface of the lower portion airfoil substantially separated from at least portions of a lower surface of the upper portion airfoil, the upper and lower portions airfoils together forming an elliptical shape when viewed cross-sectionally; and
    a second rotor rotatably mounted to the body for rotation in a second direction that is opposite to the first direction, the second rotor having an upper portion forming an upper portion airfoil and a lower portion forming a lower portion airfoil, at least portions of an upper surface of the lower portion airfoil substantially separated from at least portions of a lower surface of the upper portion airfoil, the upper and lower portions together forming an elliptical shape when viewed cross-sectionally.

18. An aircraft according to claim 17, wherein the body is located between the upper and lower portion airfoils of both the first and second rotors.

19. An aircraft according to claim 18, wherein the upper and lower portion airfoils of respective ones of the first and second rotors are joined at respective outer wing tips and are substantially separated along respective main body rotational mounting portions thereof.

20. An aircraft according to claim 17, wherein the first rotor is smaller than the second rotor and is located inside the elliptical shape of the second rotor.

21. An aircraft according to claim 17, wherein the upper and lower airfoils of the first and second rotors comprise blades that are essentially flat along the respective chord lengths.

22. An aircraft according to claim 17, wherein engines are located adjacent outer wing tips of both the upper and lower portion airfoils of the first and second rotors.

23. An aircraft according to claim 22, wherein the engines rotate propellers.

24. An aircraft according to claim 17, wherein each of the first and second rotors has two engines located at opposite, respective outer wing tips of the upper and lower portion airfoils of the respective rotors.

25. An aircraft according to claim 17, wherein a main portion of the body is spherical in shape, and wherein the aircraft further comprises a lower ballast mounted to and located below the main portion of the body, an upper ballast mounted to and located above the main portion of the body, the lower ballast being heavier than the upper ballast, and each of the upper and lower ballasts is spherical in shape.

26. An aircraft according to claim 25, wherein the lower ballast is located below the first and second rotors, and the upper ballast is located above the first and second rotors.

27. An aircraft according to claim 25, wherein the body, the first and second rotors, and the upper and lower ballasts are each mounted to a single vertical shaft.

28. An aircraft, comprising:
a body;
a first rotor rotatably mounted to the body for rotation in a first direction; and
a second rotor rotatably mounted to the body for rotation in a second direction that is opposite to the first direction, the first and second rotors forming separate continuous loops, and the first rotor rotates within the continuous loop of the second rotor.

29. An aircraft according to claim 17, wherein flight for the aircraft is provided exclusively by the first and second rotors.

* * * * *